Figure 1:
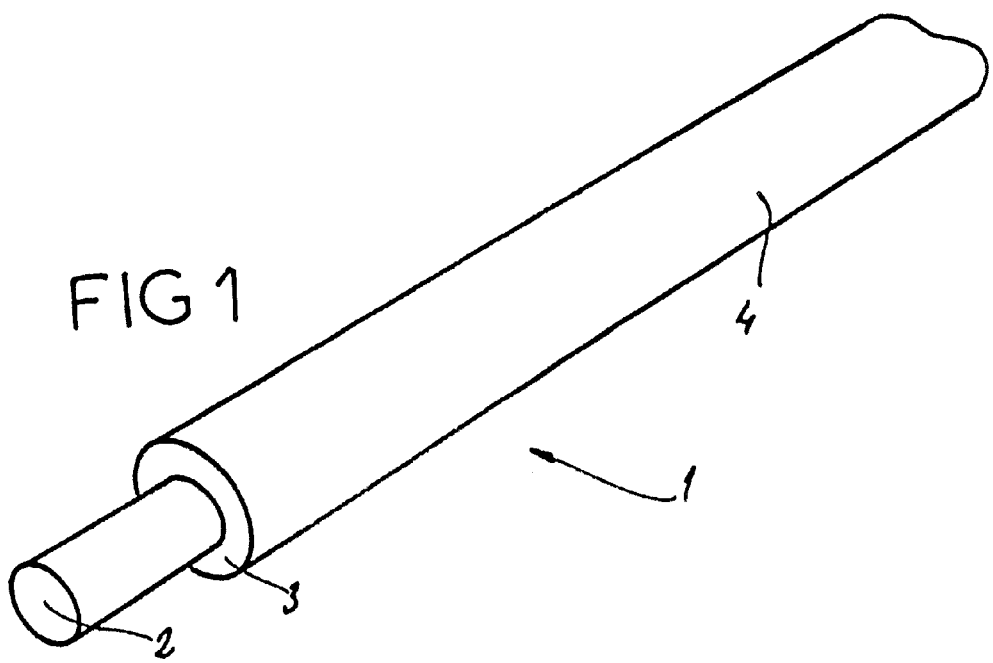

United States Patent

Legrand

[11] Patent Number: 6,061,914
[45] Date of Patent: May 16, 2000

[54] CUTTING LINE WITH IMPROVED DEGRADABILITY FOR BRUSH CUTTERS AND EDGE TRIMMERS

[75] Inventor: Emmanuel Legrand, Villeneuve, France

[73] Assignee: Speed France, Villefranche sur Saone, France

[21] Appl. No.: 09/120,363

[22] Filed: Jul. 21, 1998

[30] Foreign Application Priority Data

Jul. 23, 1997 [FR] France .................................. 97 09608

[51] Int. Cl.[7] .................................................. A01D 34/67
[52] U.S. Cl. ........................................ 30/347; 264/176.1
[58] Field of Search ........................... 30/347, 345, 276; 56/12.7, 289, 12.5, 294; 83/433; 428/373, 395, 143, 141; 525/437, 54.3

[56] References Cited

U.S. PATENT DOCUMENTS

| | | | |
|---|---|---|---|
| 4,054,993 | 10/1977 | Kamp et al. | 30/276 |
| 4,173,912 | 11/1979 | Holp | 83/433 |
| 4,186,239 | 1/1980 | Mize et al. | 30/276 |
| 4,223,441 | 9/1980 | Everts. | |
| 4,459,337 | 7/1984 | Hansen | 428/395 |
| 4,584,240 | 4/1986 | Herbert et al. | 428/373 |
| 4,624,880 | 11/1986 | Goulding et al. | 428/143 |
| 4,711,076 | 12/1987 | Long | 56/295 |
| 4,869,055 | 9/1989 | Mickelson | 56/12.7 |
| 5,220,774 | 6/1993 | Harbeke et al. | 30/347 |
| 5,354,616 | 10/1994 | Fish, Jr. et al. | 428/373 |
| 5,441,115 | 8/1995 | Horzepa | 30/347 |
| 5,524,350 | 6/1996 | Boland | 30/347 |
| 5,616,657 | 4/1997 | Imamura et al. | 525/437 |
| 5,687,482 | 11/1997 | Behrendt | 30/347 |
| 5,714,230 | 2/1998 | Kameoka et al. | 428/141 |
| 5,735,049 | 4/1998 | Ishikawa | 30/347 |
| 5,761,816 | 6/1998 | Morabit et al. | 30/347 |
| 5,898,049 | 4/1999 | Muller et al. | 525/54.3 |

FOREIGN PATENT DOCUMENTS

WO 95 06402  3/1995  WIPO.

OTHER PUBLICATIONS

Patent Abstracts of Japan, vol. 018, No. 242, May 10, 1994 and JP 06 030627 A, Zenoah Komatsu, Co. Feb. 8, 1994.
Patent Abstracts of Japan, vol. 18, No. 150, Mar. 14, 1994 and JP 05 328821, Maruyama Mfg. Co., Dec. 14, 1993.

*Primary Examiner*—Rinaldi I. Rada
*Assistant Examiner*—Omar Flores Sańchez
*Attorney, Agent, or Firm*—Herbert Dubno

[57] ABSTRACT

This cutting line intended to trim and cut vegetation can be used in rotary-head implements such as brush cutters and edge trimmers. The cutting line consists of a core made of biodegradable and/or photodegradable substance which is covered with a coating or "skin" made of a synthetic substance such as polyamide or polyurethane, forming the exterior surface of the line. Such a line can thus be broken down more rapidly after use, while at the same time retaining excellent mechanical qualities while it is being used.

13 Claims, 1 Drawing Sheet

CUTTING LINE WITH IMPROVED DEGRADABILITY FOR BRUSH CUTTERS AND EDGE TRIMMERS

1. Background of the Invention

The present invention relates to cutting lines intended for trimming and cutting vegetation, which can be used in motorized rotary-head cultivation implements, commonly known as brush cutters and edge trimmers.

2. Description of the Prior Art

These implements are generally fitted with a combustion engine or electric motor which rotates at a high speed which may be between about 3000 revolutions per minute and drives and 12000 revolutions per minute, a rotary cutting head which carries one or more cutting lines. As the head rotates, and under the effect of centrifugal force, the cutting line or lines splay out radially and thus sweep a certain circular area, within which they have the effect of cutting the vegetation they encounter.

Cutting lines currently manufactured and marketed for such use are smooth monofilaments, usually of the "one-material" type, which therefore have the qualities and weaknesses of the raw materials used to make them.

The raw materials most often used to make cutting lines are synthetic substances, and more particularly polyamide 6, copolyamide 6/66 and copolyamide 6/12. These substances can be very slightly modified or filled to improve their basic characteristics. These substances are always extruded in the form of monofilaments which can have varying diameters and cross-sections, in particular a round cross-section, but also polygonal or star-shaped profiles or cross sections.

The cutting lines currently manufactured are satisfactory, but their characteristics, performance and other qualities are still limited by the properties of the raw materials used to make them. Despite their qualities, these cutting lines still retain some defects or inadequacies.

In particular, traditional cutting lines made of polyamide are practically non-degradable in the environment after use. Admittedly, ultraviolet radiation manages to damage the exterior surface of these lines, as do moisture and oxygen contained in the air, but the breakdown process is extremely slow, propagated layer by layer from the exterior of the line toward its inside.

The amount of fragmented or worn away cutting line strewn across the entire earth each year is estimated at 10,000 tonnes, and this is broken down only very slowly. A certain number of European environmental protection steps are aimed at limiting the pollution caused from the breakage, wearing away or fragmentation of synthetic monofilaments during their use, but current lines are not yet able to meet these legislatory requirements.

Current knowledge is not aware of any substance which by itself can be used to produce a cutting line which degrades more quickly, in a way that meets the legislatory requirements, while at the same time retaining the basic qualities that these lines need for their main function, namely that of cutting the vegetation.

SUMMARY OF THE INVENTION

The object of the present invention is to provide an improved cutting line which, in particular, can be broken down quite quickly by biodegrading and/or photodegrading, while at the same time retaining properties, particularly mechanical properties, that allow it to fulfill effectively its role as a cutting line.

To this end, the subject of the invention is a cutting line for brush cutters and edge trimmers which consists of a single or multiple internal part or core, made of a material chosen for its biodegradability and/or photodegradability qualities, which is coated with a synthetic substance such as polyamide or polyurethane which, in particular, forms the exterior surface of the cutting line.

Thus, the invention solves the problem of the degrading of the cutting line by giving it a composite structure, which is the result of a central core and an exterior coating or "skin".

The exterior coating, which in particular is made of polyamide or of polyurethane, makes it possible to obtain an effective and reliable cutting line which, in particular, has excellent resistance to impact, abrasion and breakage, avoiding the risk of "breaking off at the eyelet", a phenomenon which is well known in the field of rotary-head brush cutters.

As for the degradable core, this plays its part in many ways:

- As it is located within the cutting line, and occupies only a fraction of the cross-section of this line, the core does not alter the mechanical properties of the line that are sought for use of this line, and in particular its cutting qualities, which are determined only by the substance that forms the exterior surface of said line.
- After the cutting line has been used, the fragments of this line that are strewn over the ground begin to break down particularly "from the inside", the degradable core disappearing quite quickly.
- Once the core has been destroyed, an interior passage is formed in what remains of the cutting line, and the coating substance of the line, such as polyamide or polyurethane, is attacked both from the outside and from the inside (the oxygen and moisture in the air entering the interior channel), and therefore quite quickly.
- The fact that the degradable core occupies a fraction of the cross-section of the cutting line also implies a reduction in the amount of material, such as polyamide, which is more difficult to break down.

The core may advantageously be made of a biodegradable synthetic resin which can be pure or mixed with other synthetic substances. By way of example, it is possible, in this case, to use a polycaprolactone-based biodegradable resin such as the one marketed by UNION CARBIDE under the trade name TONE POLYMERS (registered trade mark).

As an alternative, the core can also be made of a photodegradable substance, for example of rutile or anatase titanium oxide, or alternatively of cerium stearate, which are substances that are very sensitive to ultraviolet radiation, mixed as a filler with a synthetic substance. Other elastomeric products with a poor ultraviolet-radiation behavior, used pure or as a mixture, may also be envisaged.

It will be noted, in the case of a core made of a photodegradable substance, the coating substance such as polyamide or polyurethane needs to be as transparent as possible, so that the ambient light can fully reach the core in order to destroy it as quickly as possible. Of course, in the case of a core made of a biodegradable substance, the coating substance can be opaque or colored, without this causing any drawbacks.

The cutting line with improved degradability that is the subject of the invention can be manufactured economically by coextruding the degradable central core with the coating substance, the respective substances of the core and of the coating having to be compatible at the time of manufacture. The ratio of the cross-sections of the core and of the coating substance may vary, and needs to be defined in such a way as to allow quick enough breakdown of the cutting line, while at the same time preserving its good mechanical properties.

The degradable core may have various profiles.

Thus, it may have a round cross-section, which is the simplest shape, but it may also have a star-shaped or ribbed profile, the advantage of which is threefold:

Firstly, such a cross-section increases the area over which the coating can adhere to the core, and thus improves the attachment of the coating to the core.

Secondly, a core of ribbed or star-shaped cross-section may have an increased area for contact with ultraviolet radiation, for the same amount of substance, hence allowing quicker photodegradation of said core.

Finally, after such a core has been destroyed, an interior channel with a larger wall area is obtained, offering a larger surface area for attacking the coating substance from the inside, leading to a quicker destruction of this substance.

As an alternative, instead of a single core, the cutting line that is the subject of the invention may have two or more internal parts made of a degradable substance, for example in the form of parallel filaments embedded in the same coating substance, this also increasing the surface area for attacking the coating substance from the inside and allowing this attack to be distributed better through said coating substance.

Thanks to the steps taken by the invention, it is possible to obtain a cutting line that meets the legislatory requirements in terms of degradation, namely a line which has lost 50% of its mechanical properties after two years.

BRIEF DESCRIPTION OF THE DRAWING AND OF THE PREFERRED EMBODIMENT

Figure 2:
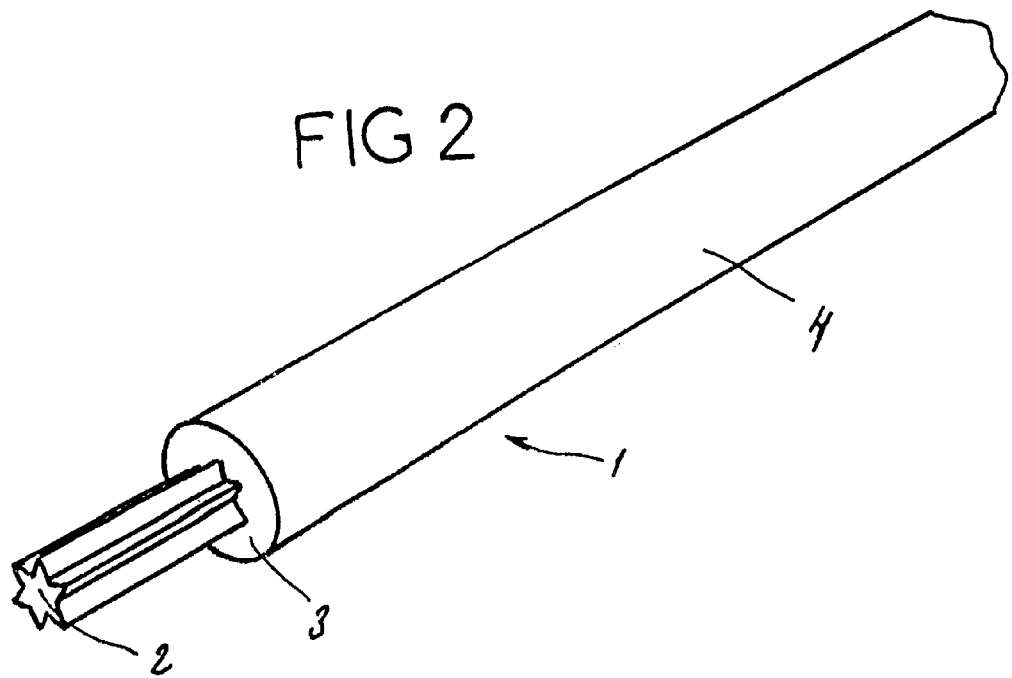

The invention will in any case be better understood with the aid of the description which follows, with reference to the appended diagrammatic drawing which depicts, by way of examples, two embodiments of this cutting line with improved degradability for brush cutters and edge trimmers:

FIG. 1 is a view in perspective of a length of cutting line in accordance with the present invention, with a core of round cross-section; and FIG. 2 is a view in perspective of another length of cutting line in accordance with the present invention, with a core of star-shaped cross-section.

SPECIFIC DESCRIPTION

FIG. 1 shows a short length of cutting line 1, for brush cutters and edge trimmers, showing the cross-section of this line. The cutting line 1 is made up of a core filament 2, in this case of round cross-section, which is coated all over with a covering or "skin" 3, the ring-shaped cross-section of which has an exterior contour which is also round.

The coating substance that forms the covering or "skin" 3, is in particular polyamide or polyurethane, giving the cutting line 1 the properties of resistance to impact, abrasion and breakage, that are sought-after for its use. This synthetic substance in particular forms the smooth exterior surface 4 of the cutting line 1.

The core 2 of the cutting line 1 is made of a biodegradable and/or photodegradable substance.

This cutting line 1 is obtained, in a single operation, by coextruding the core filament 2 and the "skin" 3.

FIG. 2 shows a short length of another cutting line 1, in which the core filament 2, still made of biodegradable and/or photodegradable substance, has a star-shaped cross-section, offering a larger area for contact with and adhesion to the coating substance that forms the "skin" 3.

In all instances, once the cutting line 1 has been used, the core filament 2 degrades relatively quickly, its breakdown being accompanied by the formation of an internal channel or cavity. In the case of a core filament 2 made of a photodegradable substance, the "skin" 3 is made of a transparent synthetic substance, so as to allow the light, and particularly ultraviolet radiation, to reach the core filament 2 over its entire length.

It would not be departing from the scope of the invention if the ratio of the diameters of the degradable core 2 and of the "skin" 3 were to be modified, or if the cross-section of the core 2 and/or of the "skin" 3 were to be given contours other than those illustrated, or alternatively if the core 2 and the "skin" 3 were to be made of substances other than those mentioned but which were compatible with each other and maintained the sought-after properties.

I claim:

1. A cutting line for a vegetation cutter having a rotary head, said cutting line consisting of:

a core composed of at least one material selected from the group which consists of biodegradable and photodegradable substances; and a coating on said core forming an exterior surface of said cutting line and composed of a synthetic substance selected from the group which consists of polyamide and polyurethane.

2. The cutting line defined in claim 1 wherein said core consists of a single element running through said cutting line.

3. The cutting line defined in claim 1 wherein said core consists of a plurality of elements running through said cutting line.

4. The cutting line defined in claim 1 wherein said core is a single pure biodegradable synthetic resin.

5. The cutting line defined in claim 1 wherein said core consists of a biodegradable synthetic resin listed with another substance.

6. The cutting line defined in claim 1 wherein said core is made of a polycaprolactone-based biodegradable resin.

7. The cutting line defined in claim 1 wherein said core comprises a synthetic substance containing a filler selected from the group which consists of rutile titanium oxide, anatase titanium oxide and cerium sterarate as a filler.

8. The cutting line defined in claim 1 wherein said core consists of a photodegradable substance and said coating is transparent.

9. The cutting line defined in claim 1 wherein said core has a round cross section.

10. The cutting line defined in claim 1 wherein said core has ribs extending along it.

11. The cutting line defined in claim 1 wherein said core has a star-shaped cross section.

12. The cutting line defined in claim 3 wherein said elements are parallel filaments embedded in said coating.

13. A method of making a cutting line for a vegetation cutter having a rotary head, said method comprising coextruding a core developed of at least one material selected from the group which consists of biodegradable and photodegradable substances, a coating on said core forming an exterior surface of said cutting line and composed of a synthetic substance selected from the group which consists of polyamide and polyurethane.

* * * * *